United States Patent
Bugnet et al.

(10) Patent No.: US 6,933,008 B2
(45) Date of Patent: Aug. 23, 2005

(54) LEAD-COATED COMPLEX POROUS STRUCTURES AND CORRESPONDING METHOD OF CONDUCTIVE ACTIVATION

(75) Inventors: Bernard Bugnet, Le Plessis Trévise (FR); Denis Doniat, Paris (FR)

(73) Assignee: S.C.P.S. S.A., Rosny-sous-Bois (FR)

( * ) Notice: Subject to any disclaimer, the term of this patent is extended or adjusted under 35 U.S.C. 154(b) by 163 days.

(21) Appl. No.: 10/354,734

(22) Filed: Jan. 30, 2003

(65) Prior Publication Data

US 2003/0150740 A1 Aug. 14, 2003

Related U.S. Application Data

(63) Continuation of application No. PCT/IB01/01357, filed on Jul. 27, 2001.

(30) Foreign Application Priority Data

Aug. 1, 2000 (FR) .............................................. 00 10107

(51) Int. Cl.$^7$ .............................. B05D 1/36; B05D 1/38; B05D 5/12
(52) U.S. Cl. ........................ 427/244; 427/352; 427/412; 427/412.1; 427/427; 427/429; 427/430.1
(58) Field of Search ................................ 427/243, 244, 427/412, 412.1, 430.1, 429, 427, 427.7, 352

(56) References Cited

U.S. PATENT DOCUMENTS

| 4,636,430 A | | 1/1987 | Moehwald ............... 428/304.4 |
| 5,198,266 A | | 3/1993 | Witucki et al. .......... 427/126.2 |
| 5,523,119 A | * | 6/1996 | Wettermark et al. ........ 427/244 |
| 6,290,832 B1 | * | 9/2001 | Bugnet et al. ............... 205/161 |
| 6,551,661 B1 | * | 4/2003 | Bugnet et al. ............... 427/301 |
| 2004/0089849 A1 | * | 5/2004 | Osherov et al. ............ 252/500 |

FOREIGN PATENT DOCUMENTS

| EP | 0 761 710 | | 3/1997 |
| JP | 06-041515 A | * | 2/1994 |
| WO | WO 98/48108 | | 9/1999 |

* cited by examiner

*Primary Examiner*—Erma Cameron
(74) *Attorney, Agent, or Firm*—Sturm & Fix LLP

(57) ABSTRACT

A complex porous structure of a reticulated foam, felt or fabric types, wherein their metallisation over their entire developed surface, by electrolysis of lead or lead alloys, is made possible by a specific preliminary conductive activation treatment obtained by using two consecutive phases of coating the developed surface of the structures, comprising a first deposition of a conductive polymer, which provides the structures with the required conductivity, and a second thin deposition of conductive lacquer or varnish which ensures the surface protection of the conductive polymer against the deactivating effect of the conductive nature of the latter, due to the cathodic polarisation of the said structures in the electrolytic lead-coating bath.

13 Claims, No Drawings

LEAD-COATED COMPLEX POROUS STRUCTURES AND CORRESPONDING METHOD OF CONDUCTIVE ACTIVATION

CROSS REFERENCE TO RELATED APPLICATIONS

This application is a Continuation application of PCT/IB01/01357 filed Jul. 27, 2001, which claimed priority of French Application No. 0010107 filed Aug. 1, 2000, entitled "Lead-Coated Complex Porous Structures, and Corresponding Method for Conductive Activation" all of which are included in their entirety by reference made hereto.

BACKGROUND OF THE INVENTION

1. Field of the Invention

The invention concerns the area of the production of metallic or metallised complex porous structures. More particularly, the invention relates to the area of the production of metallic or metallised complex porous structures for use specifically as charge collectors and electrode supports for electrochemical generators, sound insulators and the like.

The structures according to the invention are intended to be metallised electrolytically with lead or lead-based alloys.

The metallic or metallised structures according to the invention are of the foam, felt or fabric types with a high degree of open porosity, presenting the appearance of dense networks of fibres or meshes with a three-dimensional framework defining a plurality of open spaces, communicating with one another and with the exterior of the structures.

2. Description of the Related Art

Foams are reticulated, cellular structures with high porosity (greater than 80%, and possibly as high as about 98%), and with open porosity as a result of cell opening, wherein the totality of the network's meshes, or at least a high proportion thereof, are in communication with one another.

Felts are random entanglements of non-woven fibres (although for the most part they are positioned substantially in the plane of the "lap" that they constitute), defining inter-fibre spaces between them with variable shapes and dimensions, communicating with one another. Their fibres may or may not be stuck with a binding agent.

Fabrics are structures made up of an assembly of intertwined textile fibres or threads, either woven or meshed. They can take the form of thick, complex structures, particularly when they are made up of two external woven faces connected by knitted threads that hold them simultaneously spaced apart and interconnected, for example such as those that can be made by Raschel-type looms.

These various complex porous structures, which, according to the invention, are intended to be metallised throughout their entire thickness, over the whole of their developed surface, without significant clogging of their porosity, can be provided in various base materials.

For the foams, organic, mineral or synthetic materials are used, and in particular polymers such as polyamide, polyurethane (polyester or polyether) or polypropylene.

For the felts and fabrics, organic, mineral or synthetic materials are also used, such as the polymers mentioned above, glass, rock or carbon fibres, or natural fibres such as cotton, wool or similar.

SUMMARY OF THE INVENTION

Structures according to the invention, made of lead or lead-based alloy or coated with lead or such an alloy, are of interest for various applications, and particularly those of electrode support-charge collectors for lead accumulators ($PbPbO_2$) with an acid electrolyte.

The lead accumulator constitutes a secondary electrochemical generator with good characteristics, particularly its low cost and its relative ease of manufacture, but it is handicapped by fairly low levels of technical performance, particularly in terms of specific energy, capacity to meet strong power demands and lifetime.

An improvement, both in specific energy and in the ability to meet strong power demands under the best conditions, can advantageously be sought through the use of electrode support-collectors that are lighter compared with the lead grids conventionally used, while constituting a dense conductive network within the active materials.

Lead or lead alloy foams—as well as fabrics and, to a lesser extent, felts—can constitute a suitable response to this object, particularly for making the anode, for which the constraints in terms of corrosion are much less severe than those relating to the cathode. It is essential to take into account the corrosion phenomena in a case like this because of the fineness of the metallic fibres or meshes in a structure according to the invention.

DETAILED DESCRIPTION OF THE INVENTION

To metallise these above identified structures electrolytically (by electroplating), the base material used should first be sensitised, i.e. in this case made electrically conductive. This is the step often called "conductive activation" of the starting substrate. Various conductive activation procedures have already been proposed, including:

- chemical deposition of metal, followed by the electrochemical deposition(s),
- deposition of conductive particles of carbon or graphite, copper, silver, for example, particularly in the form of conductive lacquer or paint, followed by the electrochemical deposition(s),
- vacuum deposition of metal, particularly by cathode sputtering, gas diffusion or ionic deposition, followed by the electrochemical deposition(s),
- chemical deposition of conductive polymer, followed by the electrochemical deposition(s) of metal.

If the chemical deposition of lead cannot be achieved, an activation performed by vacuum deposition of the same metal can enable a subsequent electrochemical deposition of lead or lead alloys to be performed. However, this would involve a costly activation step and, because of this, it would be an inappropriate technique for application to products the cost of which has to be compatible with the application, therefore low.

Activation by deposition of another metal (copper, silver etc.) would, in addition to a similar problem of cost, present difficulties associated with use in a $PbPbO_2$ accumulator in terms of compatibility with the acid electrolyte of the generator.

As for the processes involving depositing carbon or a conductive polymer, they each for different reasons prove to be incapable of permitting the subsequent deposition of lead or lead alloys.

Galvanic deposition of lead (or lead alloys) on to foam previously coated with lacquer containing particles of carbon or graphite appears virtually impossible, owing to the low level of electrical conductivity obtained by this process: after a conductive activation of the structure in this way, for about 50 to 90 g of lacquer per $m^2$ of apparent surface area of a foam 1.5 to 2.0 mm thick, a surface resistivity of the order of 500 Ω/square is measured. The conductivity achieved is therefore poor; moreover, it is often not homogeneous.

It will be recalled that the measurement of surface resistivity of such complex porous structures, after conductive activation, is carried out with the aid of an ohmmeter connected to two conductive contact blocks with square surfaces with a side "a", placed on the structure and positioned such that their sides facing one another are themselves spaced apart by a length also equal to "a". The resistivity value measured, expressed in "Ω/square", is independent of the value adopted for "a"; however, a value of "a"=1 centimetre is often used.

Based on a structure activated by deposition of a conductive polymer, and particularly polypyrrole, in accordance with the process described in the disclosure of invention FR 98 03375, French patent of Mar. 19, 1998, it proves very difficult to carry out the deposition of lead (or alloys) under economically and industrially viable conditions, despite the high level of conductivity available, since conductive activation by deposition of polypyrrole easily enables surface resistivities of 15 to 30 Ω/square to be achieved (for 5 to 10 g approximately of conductive polymer per square metre of apparent surface area of a foam 1.5 to 2.0 mm thick).

This difficulty is connected with the fact that the electrolytic deposition of lead is performed from acid solutions based on lead fluoroborate or sulfamate (sulfamic and/or fluoroboric acids), which cause at least partial deactivation of the conductive polymer layer during electrolysis. This deactivation (or dedoping) corresponds to an electrochemical reaction of deinsertion of the doping ions of the polypyrrole, which provide it with the property of electrical conduction. This deinsertion therefore results in a reduction in the conductivity of the polymer.

This phenomenon, caused by the cathodic polarisation of the structure to be metallised, in the electrolytic bath, obviously affects the performance of the electroplating operation. During any electrolysis step on a structure activated by deposition of a conductive polymer, the said structure, cathodically polarised, is subjected to a competition that takes place between the reactions of metal deposition and deinsertion of the doping ions. In the case of the deposition of lead it is the deactivation of the conductive polymer that predominates, contrary to the case observed, for example, in electrochemical copper-plating or nickel-plating baths.

Thus, despite the excellent quality of this activation, the deposition of lead has initiation difficulties and then spreads only very slowly at best, and generally in the form of arborescences and not a homogeneous deposit.

In principle, it was possible to try and solve the problem thus posed by using a different approach to the question of the deposition of lead onto the porous structure: this could be to abandon electrolysis and adopt another deposition process enabling the conductive activation step to be omitted.

As has been stated, the chemical deposition of lead is impossible to achieve. Vacuum depositions, especially for high deposition densities, prove very expensive. As for the technique of schooping, it can be used in principle for the spraying of lead in the molten state. In practice, it is preferable to avoid this for safety reasons, relating both to the operators and to the environment in general.

The object of the present invention is to provide an original response to the definition of a novel conductive activation process capable of permitting the electrolytic deposition of lead under technically and economically satisfactory conditions.

Within the framework of the present invention, the necessary search for an activation process combining on the one hand a reduced cost level with on the other hand a high degree of electrical conductivity of the structure before galvanic metallisation, has led to favouring the deposition of conductive polymer as described in French patent FR 98 03375 (publication number 2 776 211). However, it had to be possible to supplement this step with an operation enabling the activation layer to be protected from the electrochemical attack caused by the polarisation of the said structure at the cathode of the electrolytic tank without reducing the conductivity of the structure to be metallised.

Various methods of electrochemical protection of the conductive polymer can be envisaged. The choice made within the framework of the present invention was particularly based on criteria of an economic nature—the need for a strict limitation of costs—and of a technical nature—simplicity of operation, use of available industrial techniques. These considerations thus led, for example, to abandoning the design of composite polymers that would be capable of including an autoprotection function against the deactivating effect of the electrolysis of lead.

According to the present invention, an additional protective deposit is applied to the layer of conductive polymer, made up of a thin layer of conductive lacquer or varnish.

This protective lacquer is obtained by mixing at least one plasticising agent, a conductive agent and a solvent.

A certain number of selective criteria must be respected in the definition of the protective lacquer for the layer of conductive polymer.

Firstly, this lacquer must not risk causing harmful degradation of the conductive polymer layer and of its properties. In particular, the solvent or solvents used for preparing the lacquer must be selected so that no such deterioration is caused before they have fully evaporated.

The lacquer must then prove capable of chemical resistance in the lead electrolysis bath, at least until the structure has been covered by the electrodeposited metal or alloy.

The same lacquer must also be, by nature, chemically stable and electrochemically neutral in the accumulator electrode within which the structure will be used as a support-charge collector, or at least must not cause any undesirable effects there. Thus, in particular, it must not risk forming an electrochemical couple with the active material of the said electrode, and must not react in a significantly negative way in the electrolytic medium of the accumulator. This criterion thus leads, for example, to not choosing—for application in a $PbPbO_2$ accumulator—a copper-based lacquer, the conductive element of which would be corroded by the acid electrolyte of the accumulator.

To respect the economic constraints associated with the same principal application, it is important to use a lacquer that is also inexpensive. From this point of view, it is hard to envisage silver-based lacquers, particularly as they also present a risk of corrosion, especially if the structure is intended for use as a support-collector not only in the anode (negative electrode) but also in the cathode (positive electrode) of the lead accumulator.

For these various reasons, within the framework of the present invention, lacquers or varnishes loaded with carbon or graphite are favoured, despite their poor level of electrical conductivity. It is, on the other hand, important, within the framework of the present invention, that the lacquer layer is thin, as will become clear below.

In order to be able to perform the electrodeposition of lead, it is essential to have a high level of conductivity for the activated structure. That provided by conductive activation using a conductive polymer is completely satisfactory from this point of view. The need to coat the conductive polymer to protect it during electrolysis must not therefore lead to a reduction in the conductivity of the structure, which—as has been seen—is assessed by means of the surface resistivity value.

Under these conditions, the layer of protective lacquer must not substantially increase the level of surface resistivity that can be measured. The lacquer must not therefore be an electrical insulator. A carbon- or graphite-based lacquer, which has poor conductivity, must only be applied in a thin layer if it is to remain possible to measure the low surface resistivity value characteristic of the underlying deposit of conductive polymer without any noteworthy deterioration. The more the thickness of the lacquer layer increases, the more the measurement of surface resistivity that can be made approaches that characteristic of the lacquer and the less easy will be the electrolysis of the lead, until it becomes impossible.

It is clear, then, that the layer of conductive lacquer should be regarded not as a second conductive activation added on to the first (conductive polymer), which would then be applied in a thick layer (density of the order of at least 50 g of lacquer per $m^2$ of apparent surface area), but as a protective layer for the conductive polymer, which must in this case be thin so as not to reduce significantly the electrical properties conferred by the activation per se, i.e. by the deposition of conductive polymer.

It is possible, within the framework of the present invention, to achieve the deposition of a thin layer of carbon- or graphite-based lacquer of this type by various methods, particularly by brushing (for the most open structures), by immersion of the structures in a bath of lacquer, or by spraying the said lacquer through the structures.

The covering with the protective lacquer of the whole of the developed surface of the structure activated by deposition of conductive polymer must be as complete as possible so that the desired protection is most effective and that the lead electrolysis is carried out under the best conditions.

After conductive activation carried out in accordance with the process described in the document FR 98 03375 mentioned above, followed by application of a fine protective layer of carbon- or graphite-based lacquer, a porous structure according to the invention (foam, felt or fabric) therefore becomes capable of receiving an electrolytic deposition of lead or of lead-based alloy. A porous structure according to the invention, treated to become capable of receiving a coherent deposition of lead or lead alloy by electrolytic treatment, thus undergoes two consecutive preparation operations:

a conductive activation per se, by deposition of conductive polymer, e.g. by the chemical process described by French patent FR 98 03375; a surface protection treatment of the conductive activation layer by a thin covering deposition of a conductive lacquer.

It will be recalled here that the process of forming the conductive polymer on the entire surface of the fibres or meshes of the structure to be activated, as described by the patent FR 98 03375, itself comprises the following steps:
a) oxidising pre-treatment of the base structure,
b) rinsing, optionally supplemented by draining and drying,
c) deposition of a monomer,
d) draining,
e) polymerisation of the monomer, by oxidation-doping, into an electrically conductive polymer,
f) rinsing and draining,
g) optional drying.

Although the protective lacquer is itself electrically conductive, the activation function is imparted to the structure by the initial deposition of conductive polymer. The object of the conductive nature of the surface lacquer is to avoid undesirably increasing the surface resistivity of the whole, and not to supplement the conductive activation function of the conductive polymer by an improvement in the conductivity.

The conductive activation according to the invention, the reason for which is to make the porous structure capable of receiving a galvanic deposition of lead or lead alloy, must, however, be considered to be made up, for this purpose, of two main and consecutive phases: deposition of conductive polymer, followed by deposition of a thin protective layer of conductive lacquer.

As a non-limiting example of the invention, and to illustrate and explain it further, there will follow a description of the implementation, by a preferred method of applying the invention, of an overall conductive activation treatment by deposition of a conductive polymer, followed by deposition of a fine layer of conductive lacquer.

The structure that it is desired to activate with a view to an electrolytic deposition of lead, is a polyurethane foam of a grade known as "ppI 80" (grade corresponding to 80 pores per linear inch, i.e. approximately 3000 pores/linear metre), open-celled (reticulated, thus with essentially open porosity), the density of which is of the order of 30 $kg/m^3$, and the developed surface area approximately 6,500 $m^2/m^3$.

The conductive polymer is deposited using the process described by the above-mentioned French patent FR 98 03375. Polypyrrole is formed on the whole of the developed surface of the polyurethane foam without clogging of the internal porosity. After this treatment performed on a foam block, this is peeled to obtain a roll of foam sheet 2 mm thick.

On a sheet of this type, the quantity of polypyrrole fixed is about 0.008 $kg/m^2$ of apparent surface area. It can easily be varied in a useful manner, depending on the desired performance, between about 5 and 12 $g/m^2$ of apparent surface area.

It is also possible to be induced to vary these quantities as a function of the chemical nature of the base material constituting the porous substrate before activation, and of the ratio existing between developed surface area and apparent surface area.

It is, of course, possible to use porous structures according to the invention that are not of the reticulated foam type but of woven or non-woven types.

In the example mentioned, the desired surface resistivity for the definition of the activation treatment conditions had been fixed at about 20 $\Omega$/square and the measurements taken led, according to the zones, to values of between 18 and 21 $\Omega$/square. Within the framework of the present invention it is possible, using the parameters of the treatment, to choose to vary the levels of resistivity as a function of the desired performance between about 10 and 60 $\Omega$/square.

The polypyrrole is then coated by depositing a fine protective layer of conductive lacquer.

The composition used for the lacquer in this example is as follows:

10 g of polystyrene 90 g of methyl ethyl ketone 15 g of powdered carbon black with a grain size of about 1 $\mu$m.

It is also possible to make the lacquer with powdered graphite, but with generally larger grain sizes usually of the order of 2 to 3 $\mu$m, which can lead to a less regular surface state.

The conductive agent in the lacquer can be present in various forms: spherical or non-spherical powders, filaments, lenticular forms etc. Fine powders are preferably selected, as being generally more suitable for enabling a thin deposit to be obtained on the fibres or meshes of the structure and for limiting the risks of clogging of the said structure.

It is also possible to use other plasticisers, such as polyvinyl chloride, phenolic resins, synthetic rubbers or else other solvents, such as e.g. alcohols, ketones or ethers. The product commercially available as Verniphite BP 112 from Nippon Graphite Industry can perform the function of the conductive protective lacquer according to the present invention, i.e. when used in a thin layer.

In the example mentioned, the lacquer is sprayed into the interior of the structure through its two faces, so as to obtain a fine, continuous deposit covering the whole of the developed surface of the foam without clogging its pores. The solvent is then evaporated, either naturally or by air blowing or by gentle heating.

A thin layer of lacquer can also be obtained by immersing the foam sheet coated with polypyrrole into the carbon-based lacquer. This immersion is advantageously followed by blowing air through the foam, which is aimed at removing the excess lacquer that would lead to an excessively thick deposit on the meshes of the structure, or even to clogging of its pores.

In contrast with the need imposed when the layer of carbon-based lacquer itself constitutes the method of conductive activation, it is unnecessary in this case to follow its deposition with a heat treatment designed to carbonise it and thus increase the continuity of its conductivity.

The deposition of the layer of protective lacquer on the foam sheet corresponds, according to the example, to an applied mass of 0.008 kg/m$^2$ of apparent surface area. This mass can be varied, within the framework of the present invention, between about 4 and 25 g/m$^2$ of apparent surface area (i.e. about 0.3 to 2 g/m$^2$ of developed or actual surface area), without significantly increasing the surface resistivity of the foam. It should be recalled here that when the layer of carbon-based lacquer itself constitutes the method of conductive activation (and not a simple protection), the mass deposited must generally be of the order of 50 to 80 g/m$^2$ of apparent surface area for thicknesses of foam sheet of 1.5 to 2 mm (i.e. about 4 to 6 g/m$^2$ of developed or actual surface area).

After deposition of the protective lacquer, the measurements taken of the surface resistivity of the structure provide values of between 18 and 25 Ω/square. In general, it is observed that the change in resistivity varies, as a result of the application of the protective lacquer, by 0 to 5 Ω/square in relation to what it was before deposition of the lacquer. To obtain, under satisfactory conditions, an electrolytic deposit of lead or lead alloy, the resistivity of the structure activated in accordance with the present invention, i.e. after consecutive coatings with conductive polymer and then protective conductive lacquer, should not exceed about 60 Ω/square.

On a porous structure activated in accordance with the present invention, the electrolytic deposition of lead, particularly from a bath of the "fluoroborate" type, is initiated without difficulty and spreads homogenously from the entire initiation front at speeds which make the process—and the resulting products—industrially and economically viable. It is therefore possible to deposit, on the entire developed surface, from several hundred grams to several kilograms of lead per m$^2$ of apparent surface area of the structure.

It is also possible to make electrochemical deposits of lead-based alloys, such as e.g. lead-tin or lead-antimony alloys, which have mechanical and/or corrosion resistance properties superior to those of unalloyed lead.

The structure metallised in this way may or may not undergo a heat treatment intended to eliminate organic materials (substrate base material, conductive polymer, lacquer plasticiser, carbon black or graphite powder) to leave only the electrochemical alloy or metal. The low levels of the melting point of lead and its alloys, as well as their malleability, can, however, encourage the retention of the internal organic network, unless this is incompatible with the intended application.

Of course, as can easily be seen from the above, the invention is not limited to the particular embodiments that have been described by way of examples. The invention is not limited to the examples that have been given, but encompasses all the variants thereof.

What is claimed is:

1. A method for the treatment of complex porous structures of a reticulated foam, felt or fabric, intended to make it electrically conductive with a view to carrying out, over its entire developed surface, an electrochemical deposition of lead or lead alloy, wherein it is performed in two consecutive coating phases, comprising:

a) a treatment to form a conductive polymer, providing the desired continuous electrical conductivity, and b) a treatment for the surface protection of the layer of conductive polymer by a thin covering deposit of a conductive lacquer, the conductive lacquer being obtained by mixing at least a plasticizer, a solvent and an electrically conductive agent consisting of carbon or graphite, these two deposits being themselves performed through the thickness of the structures, on the surface of their fibres or meshes, without clogging their porosity.

2. A method according to claim 1, wherein the initial deposit of conductive polymer is obtained at the end of a treatment which itself comprises the following steps:

a) oxidising pre-treatment of the base structure, b) rinsing, optionally supplemented by draining and drying, c) deposition of a monomer, d) draining, e) polymerisation of the monomer, by oxidation-doping, into an electrically conductive polymer, f) rinsing and draining, and these various steps being performed one after another through the volume of the structure to be treated, and in such a way as to lead to the formation of the conductive polymer on the entire developed surface of the structures, without clogging their internal porosity.

3. The method according to claim 2, including a step of drying.

4. A method according to claim 1, wherein the conductive polymer of the initial deposit is polypyrrole.

5. A method according to claim 2, wherein the conductive polymer of the initial deposit is polypyrrole.

6. A method according to claim 3, wherein the conductive polymer of the initial deposit is polypyrrole.

7. A method according to claim 1, wherein the conductive agent of the protective lacquer is present as powders, filaments or lenticular forms.

8. A method according to claim 4, wherein the conductive agent of the protective lacquer is present as powders, filaments or lenticular forms.

9. A method according to claim 5, wherein the conductive agent of the protective lacquer is present as powders, filaments or lenticular forms.

10. A method according to claim 1, wherein the deposition of the layer of protective lacquer is performed by brushing, immersion or spraying.

11. A method according to claim 7, wherein the deposition of the layer of protective lacquer is performed by brushing, immersion or spraying.

12. A method according to claim 8, wherein the deposition of the layer of protective lacquer is performed by brushing, immersion or spraying.

13. A method according to claim 9, wherein the deposition of the layer of protective lacquer is performed by brushing, immersion or spraying.

* * * * *